No. 12,633. REISSUED APR. 16, 1907.

J. A. KEARNEY.

TONGUE REGULATOR.

APPLICATION FILED SEPT. 12, 1906.

WITNESSES:

C. A. Sundell

R. W. Powell.

INVENTOR:

BY: James A. Kearney.

F. J. Parson & Co.

ATTORNEYS.

THE NORRIS PETERS CO., WASHINGTON, D. C.

UNITED STATES PATENT OFFICE.

JAMES A. KEARNEY, OF IMOGENE, IOWA.

TONGUE-REGULATOR.

No. 12,633. Specification of Reissued Letters Patent. Reissued April 16, 1907.

Original No. 825,602, dated July 10, 1906. Application for reissue filed September 12, 1906. Serial No. 334,541.

*To all whom it may concern:*

Be it known that I, JAMES A. KEARNEY, a citizen of the United States, and a resident of Imogene, in the county of Fremont and the State of Iowa, have invented a certain new and useful Improvement in Tongue-Regulators, of which the following is a specification.

My tongue-regulator is especially adapted to be used in connection with riding-plows used in sidehill work, and embodies a certain new and useful combination to be pointed out hereinafter more fully.

Figure 1:
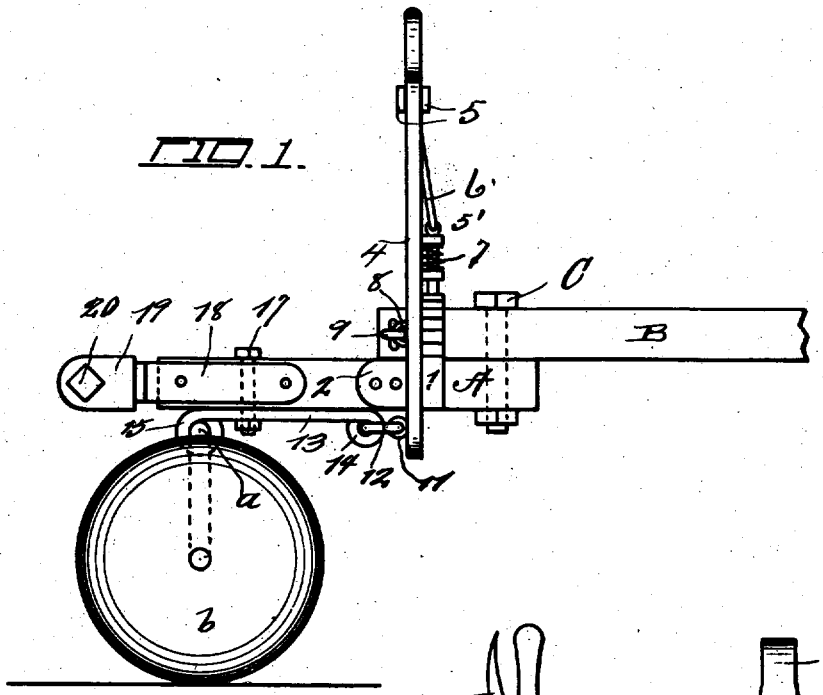
Figure 2:
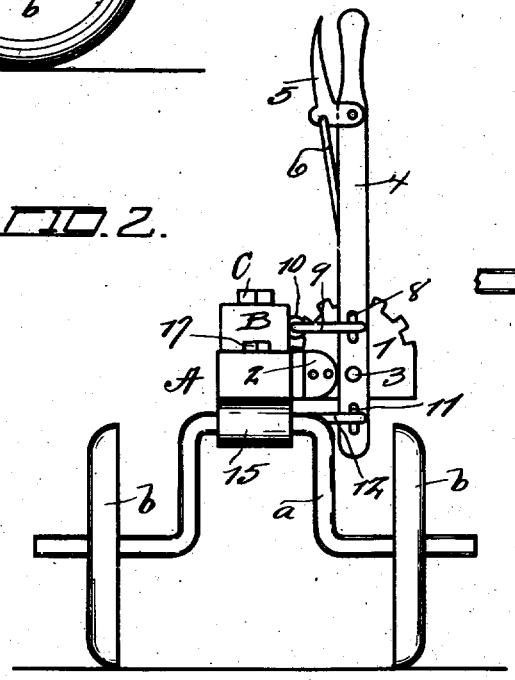
Figure 3:
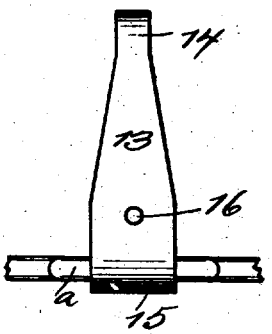

In the accompanying drawings I have shown, in Figure 1, a side view of a portion of a riding-plow provided with my tongue-regulator. Fig. 2 shows a rear view of my regulator, while Fig. 3 shows a top view of the rock-bar used in my invention.

In plowing listed corn planted upon sloping ground it is found a difficult matter to prevent the riding-plow from dragging sidewise, and it is also quite difficult to so direct the riding-plow that the cutter-disks will come into proper proximity with the growing plants.

In order to provide a simple device arranged so that the riding-plow will be guided from side to side, I secure to the usual crank-axle *a*, as shown in Fig. 2, the two usual furrow-wheels *b*. A head 19 is secured, by means of the plate 18, to a stub-tongue A. This head 19 is provided with the square opening 20, adapted to receive the riding-plow mechanism, as is usual in riding-plows of this character.

Secured to the upper crank portion of the crank-axle *a* is a rock-bar 13, from which extends a bolt 17, passing through the stub-tongue A, so that this rock-bar 13 is pivotally secured to the under side of the stub-tongue A, as is clearly shown in Fig. 1. At its forward end this rock-bar 13 is provided with an ear 14, a top of which is shown in Fig. 3, and to this ear is secured the connecting-rod 12, which extends from the eye 11 of an adjusting-lever 4, held upon the pivot 3, secured to the notched plate 1, which plate 1 is fastened, by means of the angle portion 2, to the stub-tongue A. Near the forward end this stub-tongue A is provided with the bolt C, by means of which bolt is secured the tongue B to the tongue A, so that these tongues A and B are pivotally connected. Extending from an eye 10, secured to the rear end of the tongue B, is the connecting-bar 9, secured to the eye 8 of the lever 4, this lever being provided with the pin 5′, adapted to work into the notch-sector 1 and actuated by the spring 7, as shown. The pin 5′ is provided with the rod 6 and thumb-latch 5, as is usual in adjusting-levers. Now in connection with my arrangement if it is desired to direct the furrow-wheels to the left the lever 4 is shifted to the right, which results in shifting the main tongue B so that the furrow-wheels are no longer in alinement with the stub-tongue A, but are placed at an angle thereto, so that they will advance at an angle to the stub-tongue, and to direct the wheels in an opposite direction the lever is shifted to the left. It will be observed that the main tongue, hitch, and wheels are controlled simultaneously and that the wheels are always in alinement with the main tongue B.

The invention is simple of construction and readily operated.

Having thus described my said invention, what I claim as new, and desire to secure by United States Letters Patent, is—

1. In combination with a stub-tongue, a tongue pivoted to the upper face of said stub-tongue, a rock-bar pivoted to the under face of said stub-tongue and carrying furrow-wheels, a lever pivotally supported from said stub-tongue between the pivotal points of said rock-bar and said tongue, and horizontal connections on opposite sides of the pivotal point of said lever connected to said lever and to said tongue and rock-bar.

2. In combination with the stub-tongue, a tongue pivoted thereto, a crank-axle pivoted to the under face of said stub-tongue adjacent the rear end of the latter, and a lever pivotally supported at an intermediate point from said stub-tongue and having its portion below the fulcrum thereof pivoted to said crank-axle, and having pivotal connection with the rear end of said tongue at a point above its fulcrum.

3. In combination with a stub-tongue, a tongue pivoted to the upper face of said stub-tongue, a crank-axle, means for pivotally supporting said crank-axle from said stub-tongue, said means extending forwardly, and operating means for said tongue and said first-named means, said operating means being supported from the stub-tongue and having connections with said first-named means and said tongue respectively below and above its point of support.

4. In combination with a stub-tongue, a tongue pivoted thereto, a crank-axle also pivoted to said stub-tongue, and means supported from said stub-tongue for operating said axle and pivoted tongue, said means being located to the front of the pivoted point of said axle and to the rear of said pivotal point of the tongue and being connected to said axle and said tongue.

5. In combination with a stub-tongue, a crank-axle, a support for said crank-axle pivoted near one end to said stub-tongue and having its opposite end extending forwardly, a tongue pivoted to the forward end of said stub-tongue and having its rear end extending to a point in proximity to said forward end of the crank-axle support, and means for operating said support and tongue in unison.

6. In combination with a stub-tongue, a tongue pivoted thereto, a bar pivoted to said stub-tongue and carrying furrow-wheels, said bar and tongue having their inner ends adjacent one another, and means connected to each of said inner ends of the bar and tongue for operating the same in unison.

7. In combination with a stub-tongue, a tongue pivoted thereto, a bar pivoted to the under side of said stub-tongue and carrying a crank-axle, a lever pivotally supported intermediate its ends from said stub-tongue and connections below and above the pivotal point of said lever between said lever and said bar and between said lever and tongue.

8. In combination with a stub-tongue, a tongue pivoted thereto, a crank-axle, a support for said crank-axle pivoted to said stub-tongue and having its front end extending to a point adjacent the rear end of the pivoted tongue, and a pivoted lever connected to said pivoted tongue and to said front end of said axle-support, said lever being disposed at a point between said pivotal points of the pivoted tongue and the crank-axle support.

9. In combination with a stub-tongue, a horizontally-movable tongue and a horizontally-movable furrow-wheel support pivoted to said stub-tongue, said tongue and support having their inner ends adjacent, and means connected to and for moving said inner ends in opposite directions in unison.

10. In combination with a stub-tongue, a tongue pivoted thereto, a crank-axle, a support for said crank pivoted to said stub-tongue and extending forwardly thereof, and means pivoted to said stub-tongue and movable in a plane transverse of the length thereof for operating said tongue and crank-axle, said means having connection with said crank-axle support and with said tongue.

11. In combination with a stub-tongue, a crank-axle and a tongue movably connected thereto, and means for operating said axle and tongue, said means being disposed at an intermediate point between said connections of the tongue and axle with said stub-tongue and operating in a plane transverse of the the length of the latter.

12. In combination with a stub-tongue, a crank-axle and a tongue each movably connected to said stub-tongue, and means between said points of connection of the axle and tongue with the stub-tongue for operating the axle and tongue in unison.

13. In combination with a stub-tongue, a furrow-wheel support and a tongue each movable in a horizontal rotary plane and pivoted to said stub-tongue, and means connected to said support and tongue for operating the same simultaneously in opposite directions and sustaining the same against movement in any position to which they may have been moved by said means.

14. In combination with a stub-tongue, a bar pivoted to the under side of said stub-tongue, a crank-axle secured to the rear end of said bar, a tongue pivoted to the upper side of said stub-tongue, an adjustable lever pivotally supported from one side face of said stub-tongue and located between said pivotal points of said tongue and said bar and operable in a plane transverse of the length of said tongue, and connecting parts leading from said lever to the front end of said bar and to the rear end of said pivoted tongue.

In testimony whereof I affix my signature in presence of two witnesses.

JAMES A. KEARNEY.

Witnesses:

C. B. ABBOTT,

IRA LABER.